May 27, 1941.  F. O. REINHARDT  2,243,393
CONDIMENT HOLDER
Filed May 3, 1940
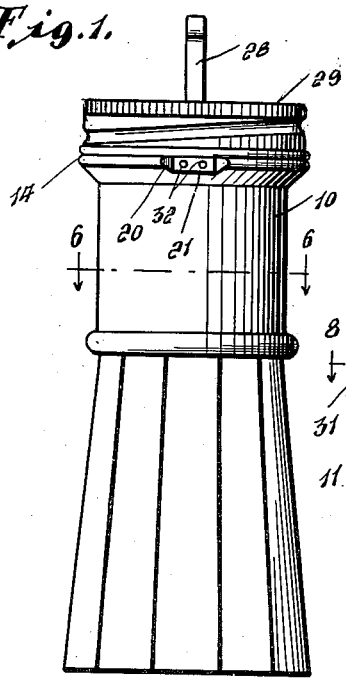
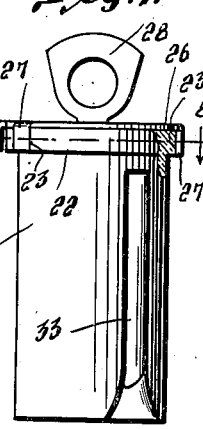
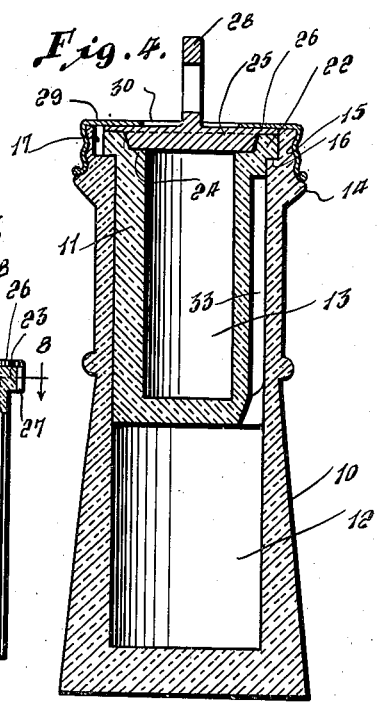
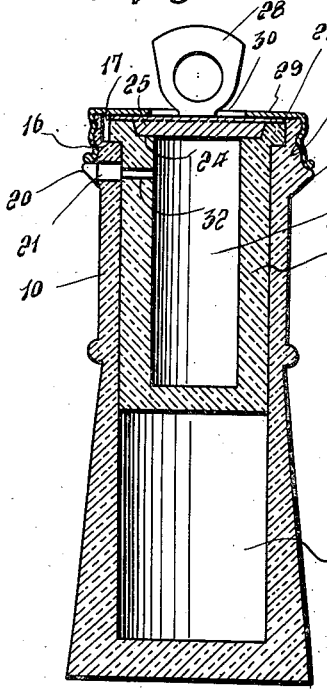
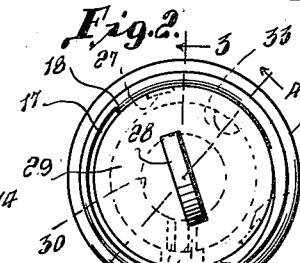
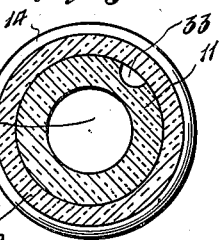
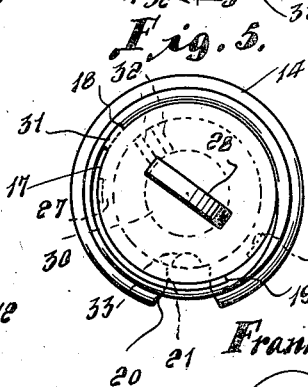
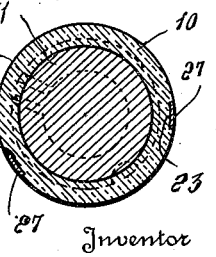
Inventor
Frank O. Reinhardt
By
Bryant & Losey
Attorneys Patented May 27, 1941

2,243,393

UNITED STATES PATENT OFFICE 2,243,393

CONDIMENT HOLDER

Frank O. Reinhardt, Pawtucket, R. I.

Application May 3, 1940, Serial No. 333,218

4 Claims. (Cl. 65—45)

This invention relates to certain new and useful improvements in condiment holders.

The primary object of the invention is to provide a condiment holder of a combination character for the dispensing of two different condiments, preferably of a powdered or granular character, such as salt and pepper, the construction being such that separate chambers are provided for the different condiments with one of the chambers being movable relative to the other condiment and having means cooperating therewith to permit the discharge of the condiment from a selected chamber.

With the above and other objects in view that will become apparent as the nature of the invention is better understood, the same consists in general of certain novel details of construction and combination of parts hereinafter more fully described, illustrated in the accompanying drawing and claimed.

In the accompanying drawing:

Figure 1 is a side elevational view of a condiment holder constructed in accordance with the present invention, Figure 2 is a top plan view, Figure 3 is a vertical longitudinal sectional view taken on line 3—3 of Figure 2, showing the inner chamber or receptacle of the holder positioned for the dispensing of its contents while the outer larger chamber is cut off, Figure 4 is a vertical longitudinal sectional view, taken on line 4—4 of Figure 2, with both chambers or receptacles cut off from dispensing, Figure 5 is a top plan view similar to Figure 2 showing the inner receptacle rotated to a position to permit discharge of the contents of the outer receptacle, Figure 6 is a cross-sectional view taken on line 6—6 of Figure 1, Figure 7 is a side elevational view of the inner chamber or receptacle removed from the outer receptacle, and, Figure 8 is a cross-sectional view taken on line 8—8 of Figure 7.

The condiment holder is adapted for containing two different condiments, such as salt and pepper and comprises an outer casing 10 of any appropriate design, preferably of generally circular formation in cross-section as illustrated and of a length to rotatably support in the upper end thereof an inner receptacle 11 defining a lower chamber 12 in the outer receptacle 10, while the inner shorter upper receptacle 11 is provided with a chamber 13. The outer casing 10 adjacent the upper end thereof is provided with an outwardly directed annular bead 14 and said casing above said bead is externally threaded as at 15 for the reception of a closure cap to be later described and the upper end of said outer casing 10 above said bead and inwardly thereof is cut-away to provide an annular shoulder 16 and an upstanding annular wall 17. The wall 17 as shown in Figures 2 and 5 is cut away to provide a pair of abutment shoulders 18 and 19 slightly less than 180° apart. As illustrated, the annular bead 14 has a cut-away portion 20 communicating with a lateral discharge opening 21 in the side wall of the outer casing 10.

The inner receptacle 11 at its upper end carries an outwardly directed flange 22 resting upon the shoulder 16 at the upper end of the outer casing 10 and said flange 22 is provided with a pair of spaced peripheral notches 23, while the open upper end of the receptacle 11 is shouldered as at 24 for the reception of a closure disk 25. The closure disk 25 carries an outwardly directed flange 26 overlying the flange 22 of the inner receptacle 11 and said flange 26 carries a pair of downwardly directed fingers 27 for reception in notches 23 in the peripheral edge of the flange 22 to provide an interlocking connection with the inner receptacle 11. An upstanding finger grip or handle 28 rises from the closure disk 25 to effect rotation of the inner receptacle 11 in the outer receptacle 10. A cap 29 is threaded upon the upper threaded end 15 of the outer receptacle 10 and has a central opening 30 therein for the passage of the handle 28 for rotating the inner receptacle.

Means is provided to limit rotative movement of the inner receptacle and in addition to said abutment shoulders 18 and 19 on the vertical wall 17 of the outer receptacle 10 at the upper end thereof includes a depending finger 31 carried by the peripheral edge of the flange 26 that is movable through the cut-away portion of the wall 17 between said abutment shoulders 18 and 19 as will at once be apparent from an inspection of Figures 2, 5, 7 and 8. The inner receptacle 11 has a pair of relatively small openings 32 in the side wall thereof that are adapted to be moved into registry with the discharge opening 21 in the outer receptacle 10. The inner receptacle 10 is provided with a longitudinally extending groove 33 in the outer side thereof and upon rotation of the inner receptacle 11, the groove 33 that communicates with the chamber 12 in the outer receptacle 11 is adapted to register with the discharge opening 21 in the outer receptacle so that the contents of the chamber 12 can flow outwardly through the groove 33 and be discharged through the lateral opening 21 in the outer receptacle. The handle 28 carried by the inner receptacle 11 effects rotation of the latter for placing the chamber 13 of the inner receptacle in communication with the discharge opening 21 in the outer receptacle and by rotation of the inner receptacle the chamber 12 of the outer receptacle is placed in communication with the discharge opening 21 by way of the groove 33 in the outer side of the inner receptacle.

From the above detailed description of the invention, it is believed that the construction and operation thereof will at once be apparent, and while there is herein shown and described the preferred embodiment thereof, it is to be understood that minor changes may be made in the details of construction such as will fall within the scope of the invention as claimed.

I claim:

1. In a combined condiment holder, an outer receptacle, an inner receptacle rotatably supported in the upper end of the outer receptacle providing a chamber at the lower end of the outer receptacle, the upper end of the outer receptacle having a lateral discharge opening therein, the upper end of the inner receptacle having a lateral discharge opening adapted to be moved into registry with the aforesaid opening and the outer side of the inner receptacle having a longitudinally extending groove therein adapted to form communication between the lower chamber and the discharge opening in the outer receptacle.

2. A combined condiment holder as set forth in claim 1, wherein means is provided for limiting rotary movements of the inner receptacle with the chamber of the outer receptacle and the inner receptacle respectively being in communication with the discharge opening in the outer receptacle at limits of rotary movements of the inner receptacle.

3. In a combined condiment holder, an outer receptacle, an inner receptacle rotatably supported in the upper end of the outer receptacle providing a chamber at the lower end of the outer receptacle, the upper end of the outer receptacle having a lateral discharge opening therein, the upper end of the inner receptacle having a lateral discharge opening adapted to be moved into registry with the aforesaid opening and the outer side of the inner receptacle having a longitudinally extending groove therein adapted to form communication between the lower chamber and the discharge opening in the outer receptacle, a removable closure for the inner receptacle and a cap engageable with the outer receptacle and removable closure for retaining the latter in position and for retaining the inner receptacle in the outer receptacle.

4. A combined condiment holder as set forth in claim 1, wherein means is provided for limiting rotary movements of the inner receptacle with the chamber of the outer receptacle and the inner receptacle respectively being in communication with the discharge opening in the outer receptacle at limits of rotary movements of the inner receptacle, a removable closure for the inner receptacle and a cap engageable with the outer receptacle and removable closure for retaining the latter in position and for retaining the inner receptacle in the outer receptacle.

FRANK O. REINHARDT.